April 10, 1962 R. D. GOLD ET AL 3,029,353

VARIABLE PULSE DELAY USING SEMICONDUCTOR IMPACT IONIZATION EFFECT

Filed July 7, 1959

INVENTORS
ROBERT D. GOLD &
MARTIN C. STEELE
BY John V. Regan
ATTORNEY 3,029,353

VARIABLE PULSE DELAY USING SEMICONDUCTOR IMPACT IONIZATION EFFECT

Robert D. Gold, New Brunswick, and Martin C. Steele, Princeton, N.J., assignors to Radio Corporation of America, a corporation of Delaware Filed July 7, 1959, Ser. No. 825,608
8 Claims. (Cl. 307—88.5)

This invention relates in general to delay devices and, more particularly, to variable delay devices for providing a short interval delay that is variable in extent.

Delay devices are used extensively in the fields of communication and information handling, for example, to provide a short-term memory or delay of information signals. Such devices are also used to provide gating signals at selected time intervals in an operating cycle for controlling the operation of other devices and circuits. Certain advantages, such as system flexibility, obtain when the duration of delay is made variable. Moreover, variable delay devices may be used to provide pulse position modulation.

There is a need in information handling equipment, computers, for example, for circuits and devices capable of very high speed response and recovery, whereby the rate of information flow may be increased. It is desirable to provide a compatible delay device that provides a time delay of very short duration, has a fast recovery time, and is reliable in operation. Also, experimental work in the field of cryogenics has indicated the feasibility of building a high speed computer to operate at low temperatures, for example, at liquid helium temperatures. It is desirable to provide a delay device which operates reliably at these low temperatures.

Accordingly, it is an object of the present invention to provide a novel delay device.

It is another object of the present invention to provide a novel delay device whose time delay is variable.

It is still another object of the present invention to provide a variable delay device wherein the time delay is of very short duration.

Still another object of the present invention is to provide a variable delay device that operates reliably at high speed and that has a fast recovery time.

Yet another object of the present invention is to provide a delay device of the type described that is operable at very low temperatures.

These and other objects of the present invention are accomplished by controlling the pattern of breakdown in an impact ionization device. In accordance with one embodiment of the invention, an impact ionization semiconductor is maintained at a temperature at which impact ionization can occur. Three electrodes are affixed to the semiconductor by ohmic contacts. A signal source and an output load are connected between two of these electrodes. A control element of variable impedance is connected to the third electrode, which is located between the other two electrodes. The time at which current begins to flow through the output load in response to an input signal from the signal source is controlled by the variable impedance element.

The foregoing and other objects, advantages, and novel features of the invention will be more fully apparent from the following description when read in connection with the accompanying drawing, in which like reference numerals refer to like parts and in which.

Figures 1, 2, 3, 4:
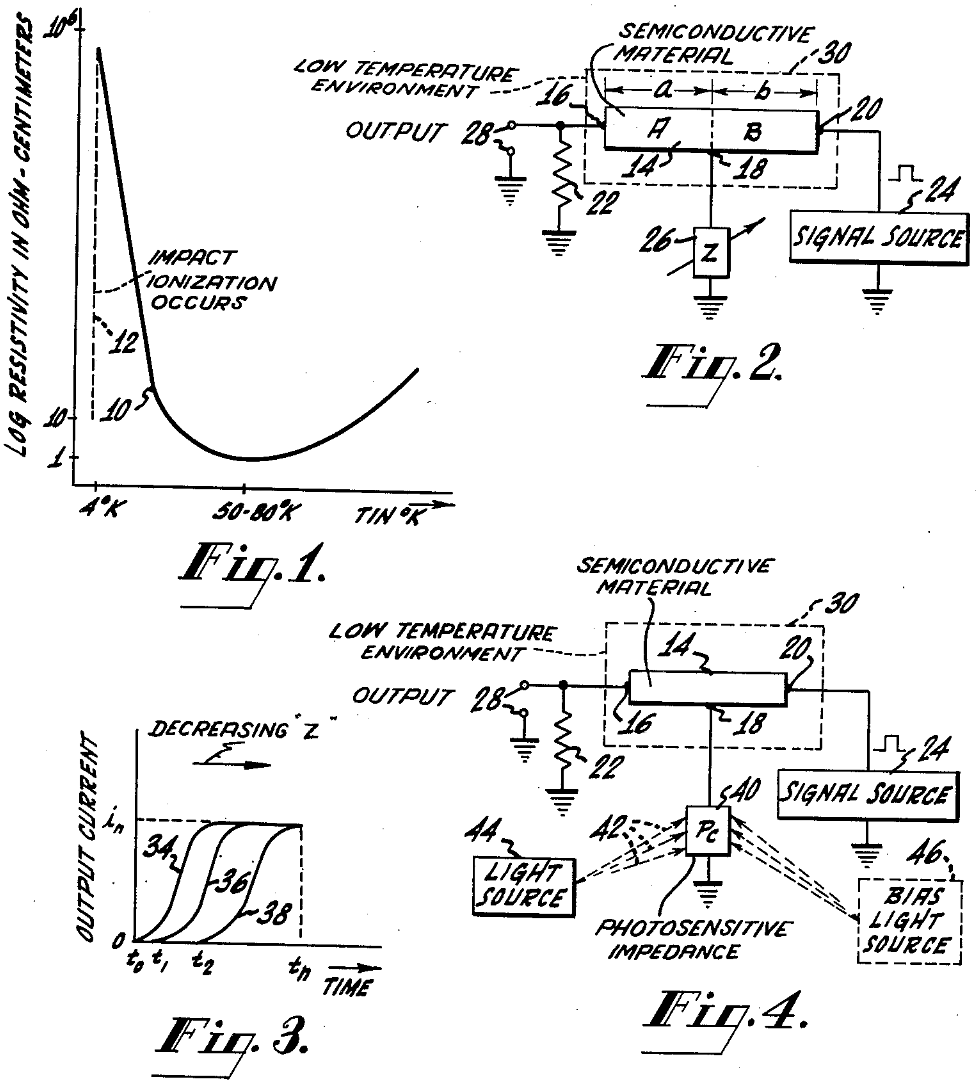
FIGURE 1 is a graph of the logarithm of resistivity versus temperature for a body of one conductivity type semiconducting material, such as germanium.
FIGURE 2 is a diagram, partly in block schematic form, of one embodiment of a delay device according to the present invention.
FIGURE 3 is a set of curves useful in explaining the operation of the delay device of FIGURE 2.
FIGURE 4 is a diagram of another delay device wherein the duration of delay is controlled by the intensity of light incident on the control element.

Many semiconductors display a marked increase in resistivity when immersed in a cryogenic environment. Germanium, for example, exhibits a sudden increase in resistivity as the operating temperature is lowered below the range of approximately 50°–80° Kelvin (K.). Other semiconductors such as n-type indium phosphide and p-type indium antimonide also display sharp increases in resistivity below approximately the same temperature range. In general, this increased resistivity is particularly marked for semiconductor materials of the extrinsic type whose electrical properties depend upon the presence of impurity substances defined in the art as donor and acceptor impurities. The increased resistivity is attributed to the decrease in the number of mobile charge carriers available at low temperatures. Most of the carriers become reattached to the impurity atoms when the thermal energy becomes considerably less than the impurity activation energy. In general, the remaining carriers may attain very high mobilities at such low temperatures. Mobility is a parameter of a charge carrier under the influence of an electric field, and is defined as the ratio of the charge carrier drift velocity to the electric field.

In certain semiconductor materials of suitable impurity concentration in a condition of low temperature and high mobility, a relatively small electric field of the order of a few volts per centimeter can impart enough energy to the remaining electric charge carriers, holes or electrons, to cause impact ionization of the donor impurities in the case of electrons and of the acceptor impurities in the case of holes. A semiconductor material of suitable impurity concentration may be defined as one in which the number of mobile charge carriers at impact ionization temperatures is many orders of magnitude less than the number of mobile charge carriers present at room temperature. The term "impact ionization", as used here, refers to a known phenomenon in which an atom of impurity substance loses an electron or hole (for donor or acceptor type impurity, respectively) and becomes an ion when struck by a charge carrier moving under the stimulus of, and acquiring kinetic energy from, a sufficiently large electric field. When impact ionization occurs, the resistivity of the semiconductor decreases sharply due to the sudden increase in the number of electric charge carriers. This sharp change in resistivity, which is defined as the breakdown (non-destructive) of the semiconductor, results in a non-linearity in the current-voltage characteristic of the semiconductor. The sudden decrease in resistivity causes a substantial increase in the flow of current through the semiconductor and through the electrical path in which the semiconductor is connected.

When an electric field having a magnitude sufficient to cause breakdown is suddenly applied between two electrodes of a semiconductor of the type described, the resulting current does not immediately attain a maximum value; a finite time interval is required during which charge carriers are generated at a substantially exponential rate, and during which the resistivity of that portion of the semiconductor between the electrodes decreases correspondingly. This time interval, which in some cases may be of the order of a millimicrosecond, is a function of the voltage gradient and other factors, and becomes shorter as the magnitude of the applied electric field is made larger. The current decreases rapidly to a very low value upon termination of the electric field. Experimental results indicate that the decay time can be of the order of one millimicrosecond.

The solid idealized curve 10 of FIGURE 1 shows, in general, how the resistivity of a body of semiconductor material such as germanium, varies with temperature. Absolute temperature T in degrees Kelvin is plotted along the abscissa, and the logarithm of resistivity in ohm-centimeters is plotted along the ordinate of the graph. At room temperature, the sample of germanuim might have a resistivity of approximately 28 ohm-centimeters. The resistivity may, for example, reach a minimum value of about 1 ohm-centimeter at a temperature of 50°–80° K. and then rise rapidly to approximately $10^6$ ohm-centimeters at about 4° K. The large increase in resistivity at low temperatures is due to the recombination with the impurity atoms of the large majority of mobile charge carriers which are present at the higher temperatures. When an electric field of sufficient amplitude is applied to the sample after its temperature has been adjusted to a value at which breakdown can occur, the remaining few charge carriers obtain such high velocities from the electric field that they cause impact ionization of the donors or acceptors. When this ionization occurs, the resistivity, which may be of the order of $10^6$ ohm-centimeters (the exact value depending upon various factors, such as the temperature of the sample prior to breakdown and the impurity concentration) changes extremely sharply to a low value, for example, of the order of 10 ohm-centimeters. This change in resistivity due to ionization is illustrated in the drawing by the dashed vertical line 12 at approximately 4° K.

A preferred embodiment of a variable delay device according to the present invention is illustrated in FIGURE 2. A body 14 of one conductivity type semiconductor material of the type described is provided with ohmic contact electrodes 16, 18 and 20. An output load 22, illustrated as a resistor, is connected between one end electrode 16 and a point of reference potential, illustrated as circuit ground. A signal source 24 providing signals to be delayed is connected between the other end electrode 20 and ground. Thus, the source 24 and load 22 are connected between electrodes 16 and 20. A control device 26 of variable impedance is connected between the third, intermediate electrode 18 and ground. The electrodes 16, 18, 20 are referred to hereinafter for convenience as output, control, and input electrodes, respectively. The output voltage developed across the output load 22 may be taken from across a pair of output terminals 28. One of the terminals 28 is connected to the upper end of the output load 22; the other terminal is connected to circuit ground.

The control device 26 may be, for example, an element of variable resistance, such as a rheostat. The signal source 24 may be a source of square-wave pulses. The signal pulses may be applied to the circuit through a pulse transformer (not shown), in which case the pulse transformer secondary winding is connected between the input electrode 20 and ground, and the pulse transformer primary winding is connected across the signal source 24. The signal pulses may be applied either aperiodically or periodically, as desired in any particular application. The semiconductor material is of the type which has a relatively steep resistivity versus temperature characteristic at low temperatures and which exhibits a sharp change in resistivity under certain conditions of temperature and applied electric field. Crystalline semiconductor materials such as n- or p-type germanium, p-type indium antimonide and n-type indium phosphide are among the materials which are suitable. The electrodes 16, 18, 20 may be connected to the body 14 by any of several well-known techniques for forming ohmic contacts, such as soldering to vapor-deposited metal coatings on the body 14 or to coatings formed of a cured silver paste, or by alloying to the body 14.

The body 14 of semiconductor material is immersed in a suitable low temperature environment, indicated schematically by the dashed box 30. The box 30 may represent a liquid helium cryostat or other means for maintaining the body 14 at a suitable low temperature. It is believed unnecessary to discuss in detail the known means for maintaining the body 14 at a low temperature. Suitable means are described, for example, in an article entitled "Low Temperature Electronics" in the Proceedings of the IRE, volume 42, pages 408–412, February 1954, and in other publications.

As previously described, when an electric field of sufficient amplitude to cause breakdown is applied between two electrodes of an impact ionization semiconductor, the current does not immediately attain a maximum value. A finite time interval is required during which increasing numbers of charge carriers are generated exponentially and during which the resistivity of the semiconductor decreases accordingly. The rate of current build-up in any portion of the semiconductor is generally dependent upon the voltage gradient in that portion of the semiconductor. In the embodiment illustrated in FIGURE 2, the voltage gradients in various portions of the body 14 in response to an input signal from the source 24 are determined by the setting or adjustment of the control element 26.

Consider now the operation of the delay device. Assume that the input signals from the signal source 24 are of sufficient amplitude to cause impact ionization throughout the entire body 14, but that the control element 26 is adjusted for substantially zero impedance. Because of the substantially zero impedance of the control element 26, the input pulse appears entirely between the control and input electrodes 18, 20; no electric field appears between the output and control electrodes 16 and 18. The portion of the body 14 between the control and input electrodes 18, 20, respectively, breaks down due to impact ionization; however, no current or negligible current flows in the output load 22 because of the high impedance of that portion "A" of the body 14 between the output electrode 16 and the control electrode 18.

Assume now that the control element 26 is adjusted to have infinite impedance. The electric field resulting from an input signal under these conditions is uniform between the input and output electrodes 20, 16, respectively. Breakdown occurs simultaneously throughout all portions of the body 14 between the input and output electrodes 20, 16, and the current builds up at an exponential rate. The current flow through the output load 22, and the voltage developed across the load, also increase at an exponential rate until the current reaches saturation. It is thus seen that no output is obtained in response to an input signal when the control element 26 is adjusted to have zero impedance, whereas an output is derived with minimum delay when the control element 26 has infinite impedance. The amount of delay between the time an input signal is applied from source 24 and the time an output signal appears across the output load 22 may be adjusted by suitable adjustment of the control element 26.

The manner in which the pattern of breakdown in the body 14 is controlled when the control element 26 has some finite value of resistance may best be understood by way of an example. Consider a delay device having the following characteristics:

| | |
|---|---|
| Resistance of body **14** prior to breakdown | 50 megohms. |
| Resistance of control element **26** | 6 megohms. |
| Resistance of output load **22** | 75 ohms. |
| Amplitude of input pulse | 3 volts. |
| Field required to produce breakdown | 2 volts/centimeter. |
| Length of body **14** | 1 centimeter. |
| Length "*a*" of portion A | Length "*b*" of portion B. |

Because of the dimensions of the body 14 and the assumed resistance values, approximately one-sixth of the input pulse, or one-half volt, appears initially across the body 14 portion designated "A" in FIGURE 2 in response to the input pulse of 3 volts magnitude. The resulting electric field in this portion "A" of the body 14 is one volt/centimeter, which is sufficient to produce impact ionization in portion "A." However, five-sixths of the amplitude of the input pulse, or two and one-half volts, appears across the body 14 portion designated "B." The resulting field in this portion "B" is five volts/centimeter, which is more than the two volts/centimeter required to produce impact ionization in portion "B."

Current in body portion "B" builds up at an exponential rate in response to impact ionization therein, and the resistance thereof decreases accordingly. The larger percentage of this current flows through the control element 26. When the voltage drop across the control element 26 reaches a value of one volt (because of the build-up in current and decrease in resistance of portion "B") the electric field across body 14 portion "A" is two volts/centimeter. This value of field is sufficient to cause impact ionization of the body 14 portion "A," and current then builds up at an exponential rate therein. The latter current flows through the output load 22. Also, almost all of the current from the signal source 24 flows through the output load 22 after breakdown in both portions "A" and "B" because of the very low resistances of portion "A" and the output load 22 relative to the resistance of the control element 26.

The time required for the voltage across the control element 26 to reach a value sufficient to cause breakdown in body 14 portion "A" depends primarily upon the amplitude and the initial voltage distribution of the input pulse. This distribution, in turn, depends upon the resistance value of the control element 26 for any given body 14. Increasing the resistance value of the control element 26 results in a decreased time delay; conversely, decreasing the resistance value results in an increased time delay. The maximum delay for which an output signal is obtained occurs when the current flowing between the input and control electrodes 20, 18, respectively, reaches a constant maxium or saturation value, and the product of this saturation current times the impedance of the control element 26 just equals the critical value required to produce breakdown in body portion "A."

A family of curves of output load current versus time for the delay device of FIGURE 2 is illustrated in FIGURE 3. Each of the curves 34, 36, 38 represents the load current as a function of time, for a different setting of the control element 26, in response to square wave input pulses of constant amplitude and duration $t_0$ to $t_n$. The curve 34 represents the output having the least relative delay. The resistance of the control element 26 is higher for curve 34 than for either of the other curves 36 and 38. It is to be noted that the width of the output signals decreases as the time delay increases. The maximum output current $i_n$ represents current saturation. Curve 38 represents the output having maximum delay with saturation output. This output is obtained when the impedance value of the control element 26 provides a delay such that current saturation in the portion "A" occurs just prior to the termination of the input signal.

In addition to performing the standard function of a delay device, the device of FIGURE 2 may be used to provide pulse position modulation. The impedance of the control element 26 may, for example, be varied in accordance with the position or setting of an analog device, and the time of occurrence of the leading edge of the output signal with respect to a standard may provide an indication of the value of the analog quantity.

One example of a variable delay device useful as a transducer, namely, a light-to-voltage transducer, is illustrated in FIGURE 4. The device is generally similar to the delay device of FIGURE 2, and like components are designated by like reference numerals. The control element 40 may be a photoconductor or other light-sensitive device of which the resistance is a function of the intensity of light incident thereon. Light rays 42 from a light source 44 are incident on the light-sensitive control element 40. A bias light source 46 may be provided if it is desired to provide a certain reference delay in the absence of incident light from the light source 44.

The time delay provided by the device of FIGURE 4 is determined by the resistance of the control element 40. The resistance, in turn, is determined by the intensity of light incident thereon. The operation of the device is otherwise the same as that of the device of FIGURE 2, and a detailed description is deemed unnecessary.

Alternatively, the control element 40 may be a light-sensitive element whose resistance is a function of the frequency of light incident thereon. For example, it is known that the resistance of a photoconductor, in response to received light radiation of constant intensity, is dependent upon the frequency of the reecived light rediation over specified frequency regions, which regions are characteristic of the material content of the photoconductor and the impurity content incorporated therein. In this case, the light source 44 may be a source of constant intensity, variable frequency light radiation.

Because the delay provided by an impact ionization semiconductor can be measured very accurately, such a device as that of FIGURE 4 provides a simple, accurate, and reliable means for measuring light intensity and/or light frequency.

What is claimed is:

1. A delay device comprising a semiconductor capable of exhibiting impact ionization at certain temperatures in the presence of an applied electric field; means for maintaining said semiconductor at one of said temperatures; means for applying a pulse to one point on said semiconductor to generate said electric field; a point of reference potential; an element of impedance directly connected between said reference point and a point on said semiconductor between said one point and another point; and an output load connected between said reference point and said other point for deriving a pulse which is delayed in time relative to said applied pulse and which delay is a function of the impedance of said impedance element.

2. In combination with a source of signals, a device for delaying said signals in point of time comprising: an impact ionization semiconductor having a first ohmic contact electrode connected to receive said signals; means for maintaining said semiconductor at a temperature at which impact ionization can occur; a second ohmic contact electrode and a third ohmic contact electrode affixed to said semiconductor; a point of reference potential; an output load connected between said second electrode and said reference point; and a resistive means connected between said third electrode and said reference point for controlling the amount of delay of said signals.

3. In combination, a device capable of exhibiting impact ionization at certain temperatures; means for maintaining said device at one of said temperatures; means for applying to one point on said device a voltage pulse of sufficient amplitude to cause impact ionization throughout said device; a load connected to another point on said device; an element of variable impedance connected to said device at a point between said one point and said other point, and means for adjusting the impedance of said element for determining the initial voltage distribution of said pulse in various portions of said device.

4. The combination comprising a body of one conductivity type semiconductor material of the type which exhibits a breakdown in resistivity at certain values of temperature in the presence of an electric field, means for maintaining the temperature of said body at one of said values, a plurality of ohmic contact electrodes affixed to said body, a point of reference potential, a first of said electrodes being connected to said reference point, means connected between a second one of said electrodes and said reference point for providing an electric field between said first and said second electrodes, and a variable impedance control element connected between a third of said electrodes and said reference point for controlling the intensity of said electric field in various portions of said body in accordance with the impedance of said control element.

5. The combination recited in claim 4, wherein said control element is a light-sensitive device, and means for controlling the intensity of light incident on said light-sensitive device.

6. The combination according to claim 4, wherein said control element has a resistance which varies according to the frequency of light incident thereon, and means for controlling said frequency of light incident on said control element.

7. In combination with a body of one conductivity semiconductor material which exhibits a sharp breakdown in resistivity under certain conditions of temperature and voltage gradient, means for maintaining the temperature of said body at one of said temperatures, and means for applying a voltage pulse between two points on said body, a control circuit for controlling the pattern of said breakdown in different portions of said body between said two points comprising an element of variable impedance connected to said body between said two points, and means for adjusting the impedance value of said element.

8. In combination: an impact ionization semiconductor having an input electrode, an output electrode and a control electrode, means for maintaining said semiconductor at a temperature at which impact ionization can occur, an output load and an input pulse means connected between said output electrode and said input electrode, and an impedance control means connected to said control electrode for determining the duration of delay between application of said input pulse and impact ionization current flow through said load.

References Cited in the file of this patent

UNITED STATES PATENTS

| | | |
|---|---|---|
| 2,846,643 | Foley | Aug. 5, 1958 |
| 2,863,070 | Suran et al. | Dec. 2, 1958 |
| 2,922,965 | Harrison | Jan. 26, 1960 |
| 2,941,092 | Harrick | June 14, 1960 |

OTHER REFERENCES

Gold et al.: Pulse Amplification Using Impact Ionization, Proc. IRE, vol. 47, No. 6, June 1959, pp. 1109–1117.

Schlar et al.: Impact Ionization of Impurities in Germanium, J. Phys. Chem., Solids, vol. 2, January 1957, pp. 1–23.